United States Patent
Kikuchi et al.

[11] Patent Number: 6,083,433
[45] Date of Patent: Jul. 4, 2000

[54] CLEANING BLADE AND PROCESS FOR PRODUCING SAME

[75] Inventors: Hirofumi Kikuchi, Kodaira; Kunio Machida, Tokyo, both of Japan

[73] Assignee: Bridgestone Corporation, Tokyo, Japan

[21] Appl. No.: 09/032,833

[22] Filed: Mar. 2, 1998

[30] Foreign Application Priority Data

Mar. 5, 1997 [JP] Japan ................................. 9-050506

[51] Int. Cl.[7] .............................. B28B 7/16; G03G 21/00
[52] U.S. Cl. ........................... 264/39; 264/219; 264/259; 264/271.1; 264/266; 264/279; 399/350
[58] Field of Search ............................ 264/39, 259, 266, 264/279, 271.1, 219; 399/350; 15/93.1, 236.1

[56] References Cited

U.S. PATENT DOCUMENTS

| | | | |
|---|---|---|---|
| 5,075,059 | 12/1991 | Green | 264/129 |
| 5,168,309 | 12/1992 | Adachi et al. | 355/219 |
| 5,705,254 | 1/1998 | Morinaga et al. | 428/141 |

FOREIGN PATENT DOCUMENTS 363058481   3/1988   Japan .

*Primary Examiner*—Jan H. Silbaugh
*Assistant Examiner*—Suzanne E. Mason
*Attorney, Agent, or Firm*—Oblon, Spivak, McClelland, Maier & Neustadt, P.C.

[57] ABSTRACT

There is provided a cleaning blade which is used for cleaning an image-forming body in an electrophotographic apparatus, and which has excellent performances in that the cleaning blade is minimized in the deflection of its tip part, never contaminates an image-forming body and so forth. The cleaning blade equipped with unevenness on at least part of a plate member excluding the portion of the plate member in direct contact with the image-forming body, is obtained by arranging a support member in a mold which is equipped with unevenness on at least part of the inside surface thereof in contact with a molding material for the plate member; then casting the molding material for the plate member in the mold; and curing the molding material to integrate the plate member and the support member.

3 Claims, 3 Drawing Sheets

F I G. 1
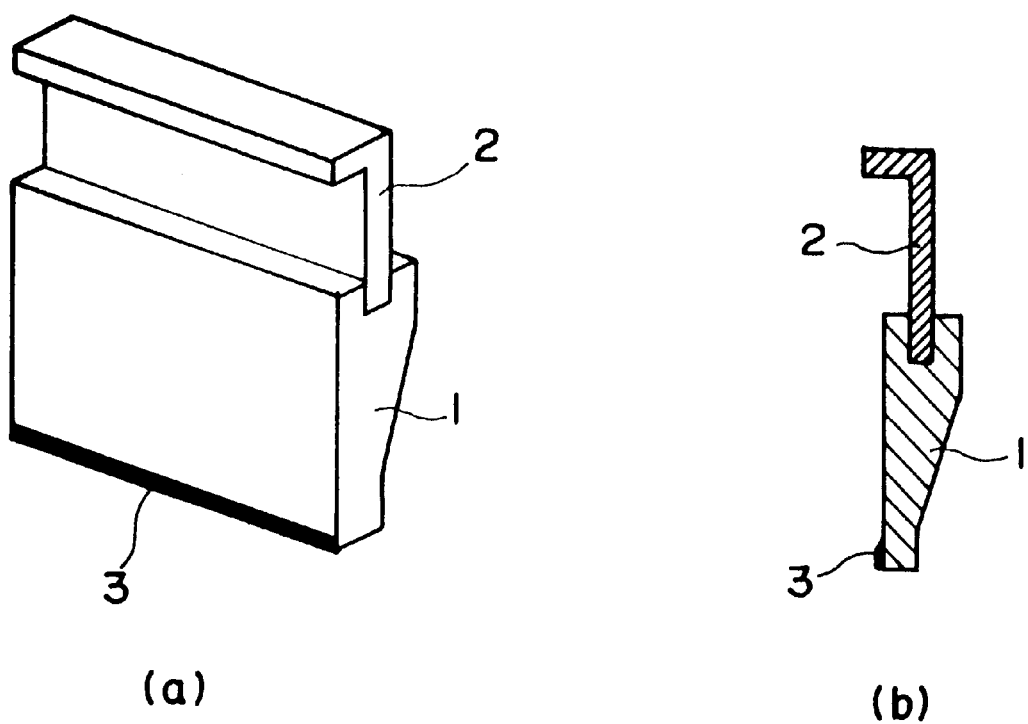
(a) (b)

CLEANING BLADE AND PROCESS FOR PRODUCING SAME

BACKGROUND OF THE INVENTION

1. Field of the Invention

The present invention relates to a cleaning blade used for the purpose of scraping off the toner remaining on the peripheral surface of an image-forming body in an electrophotographic apparatus and to a process for producing the same. More particularly, the present invention pertains to a cleaning blade which is used for said purpose and has excellent performances in that the aforesaid cleaning blades is minimized in the deflection of its tip part, never contaminates an image-forming body and so forth, and to a process for producing the aforesaid cleaning blade in high efficiency.

2. Description of the Related Arts

In an electrophotographic apparatus including a copying machine, there has heretofore been generally adopted a copying method which comprises the steps of at first, uniformly electrically charging the surfaces of a photosensitive body in which is used a photoelectro conductive substance, for example, ZnO, CdS, Se, OPC ( organic photoconductor) , and $\alpha$-Si; projecting an image there onto from an optical system to electrically discharge the part which has been stricken by the light from the optical system, thereby forming a latent image; and subsequently carrying out adhesion of a toner (development) and transfer of the toner image to a transfer material ( recording medium ) such as paper.

Since in such an electrophotographic apparatus, a toner remains on the peripheral surface of a photosensitive body (an image-forming body such as a photosensitive drum) after the transfer of a toner image, there is carried out a method in which the remaining toner is scraped and removed by bringing the tip part of a plate member 1 into sliding contact with the peripheral surface of the abovementioned. image-forming body by the use of, for example, a cleaning blade equipped with said plate member 1 and a support member 2 as shown in FIG. 1(a) perspective view and (b) cross-sectional view.

The cleaning blade imparted with such a function is required, in general, to have the performances including that (1) the cleaning blade is minimized in deflection and is straight; (2) it never contaminates or damages the image-forming body; (3) it is excellent in wear resistance; and so forth.

In such a cleaning blade, use is usually made of Ek plate member( blade part) which comprises a thermoplastic elastomer such as urethane base elastomer, and which is produced by the use of cast molding using a mold. That is to say, a cleaning blade wherein the above-mentioned plate member and the support member are integrated, is produced by arranging a support member in a mold for the objective cleaning blade, thereafter casting a molding material for the plate member in said mold and then curing the molding material.

In order to enhance the mold release property in such cast molding using the mold, use is usually made of a mold which is subjected on the surface thereof to metallic plating containing a fluorine component. However, the foregoing cast molding involves the problem that the plate member is stuck onto the inside surface of the mold, is pulled towards both sides of the mold when it is opened, and as the result, the deflection is increased at the tip part of the plate member (that is, the tip part of the cleaning blade). As a countermeasure there against, there is taken into consideration a method in which a mold release agent is applied onto the inside surface of the mold to enhance the mold release property. Nevertheless, there is caused in this case, a fear that the mold release agent is stuck onto the surface of the plate member, thereby contaminating the image-forming body.

SUMMARY OF THE INVENTION

Under such circumstances, an object of the present invention is to provide a cleaning blade which is used for cleaning an image-forming body in an electrophotographic apparatus, and has excellent performances in that the aforesaid cleaning blade is minimized in the deflection of its tip part, never contaminates an image-forming body and so forth, and also to provide a process for producing the aforesaid cleaning blade in high efficiency.

Such being the case, intensive research and development. were accumulated by the present inventors in order to develop a cleaning blade imparted with the above-mentioned excellent performances. As a result, it has been found that the deflection is minimized in the tip part of the cleaning blade which is obtained by cast molding, and an image -forming body is not contaminated by the remaining toner through the use of a mold which is equipped in advance, with unevenness on at least part of the inside surface thereof in contact with a molding material for the plate member of the cleaning blade. The present invention has been accomplished on the basis of the foregoing findings and information.

Specifically, the present invention provides a cleaning blade used for the purpose of scraping off a remaining toner on the peripheral surface of an image-forming body in an electrophotographic apparatus and constituted of a plate member made up of a thermoplastic elastomer and a support member which cleaning blade comprises unevenness on at least part thereof excluding the portion of said plate member in direct contact with the image-forming body.

In addition, the cleaning blade according to the present invention can be produced by arranging a support member in a mold which is equipped in advance, with unevenness on at least part of the inside surface thereof in contact with a molding material for the plate member, then casting the molding material for the plate member in said mold and curing the molding material to integrate the plate member and the support member.

BRIEF DESCRIPTION OF THE DRAWINGS

FIG. 1 is a perspective view (a) and a cross-sectional view (b) each showing an example of the cleaning blade according to the present invention;

1: plate member

2: support member

Figure 2:
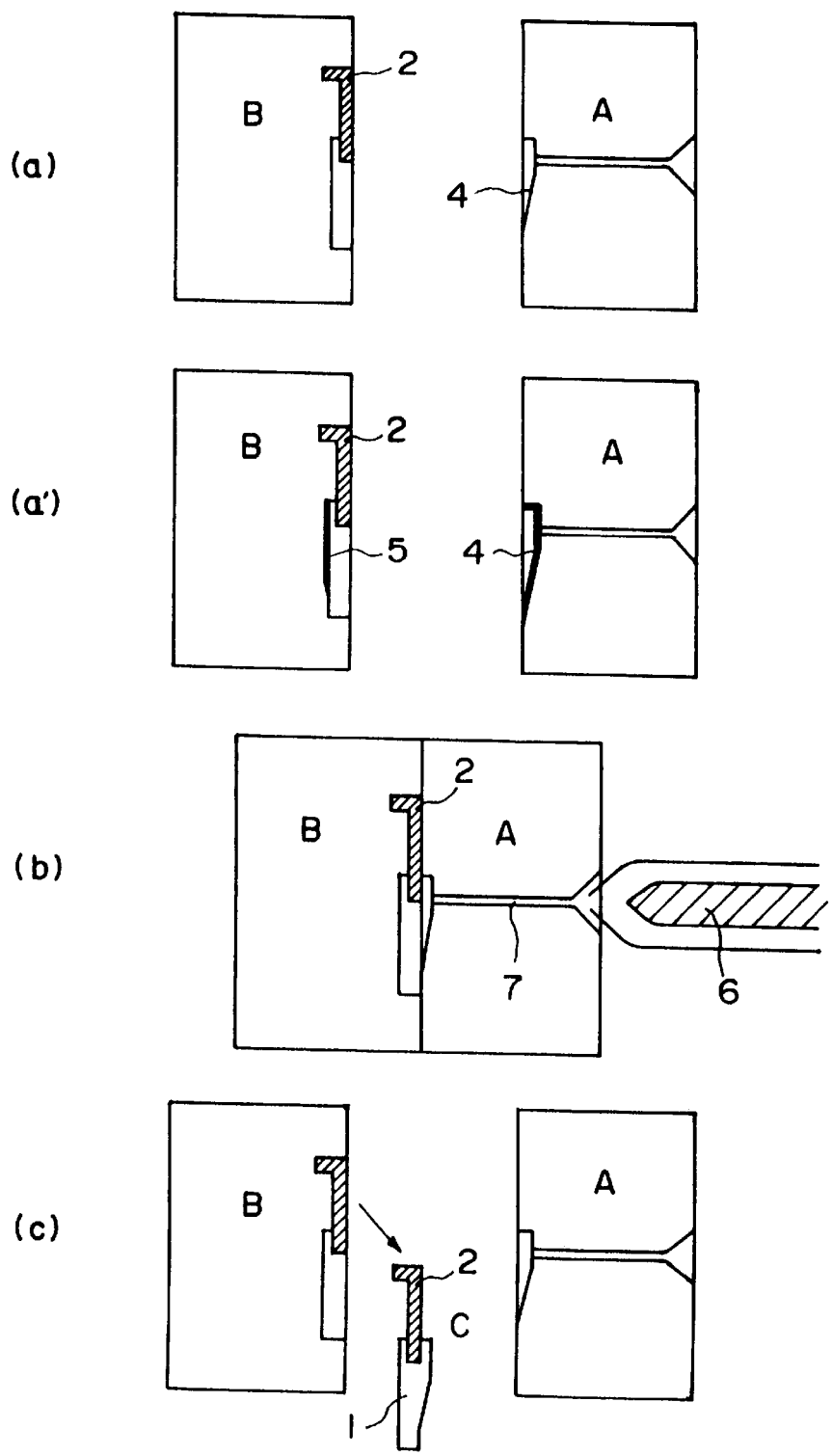
FIG. 2(a), (a'), (b), and (c) is an explanatory drawing showing an example of a process for producing the cleaning blade according to the present invention.

3: portion in contact with an image-forming body

4: portion equipped with unevenness

5: portion equipped with unevenness

6: molten thermoplastic elastomer
7: injection part
A: mold on fixed side
B mold on mobile side
C cleaning plate

DESCRIPTION OF THE PREFERRED EMBODIMENTS

The cleaning blade of the present invention is employed for the purpose of scraping off and removing a toner remaining on the peripheral surface of an image-forming body (for example, photosensitive drum and photosensitive belt) in an electrophotographic apparatus. The shape and the size of the cleaning blade of the present invention are not specifically limited, but may be properly selected from the shapes and the sizes of the cleaning blades that have heretofore been used for cleaning the image-forming body in an electrophotographic apparatus. FIG. 1, which includes a perspective view (a) and a cross-sectional view (b) each showing an example of the cleaning blade according to the present invention, points out a structure wherein the plate member and the support member are integrated, and the symbol 3 indicates the portion of the blade in direct contact with an image-forming body.

The plate member in the cleaning blade of the present invention, which is a constituent of the blade part, is made of a material comprising a thermoplastic elastomer that never damages the image-forming body and has excellent wear resistance. Such a thermoplastic elastomer needs only to be capable of being cast into a mold without specific limitation, and may be suitably selected for use from the thermoplastic elastomers that have heretofore been customarily used for cleaning an image-forming body in an electrophotographic apparatus. Examples thereof include urethane base, styrene base, olefin base, vinyl chloride base, polyester base, polyamide base and fluororesin base thermoplastic elastomers. Of these, urethane base thermoplastic elastomer is particularly preferable from the aspect of performances and economical efficiency.

The plate member in the present invention is equipped with unevenness on at least part thereof, excluding the part from the tip as shown by the symbol 3 to the place at a distance of about 0.1 mm therefrom, that is, the portion in direct contact with the image-forming body. The unevenness is, as detailed hereinafter, provided at the time of molding with a mold.

The areas on for excluding the formation of un evenness on the portion in direct contact with the image-forming body is that the aforesaid portion is required to have a smoothness of an order of 10 $\mu$m expressed in terms of an average roughness in order to scrape off a toner.

The physical properties of the plate member are not specifically limited, but may be properly selected according to the situations. It is preferable that the plate member have a hardness [Spring system hardness test (type A)] in the range of 60 to 80 as measured according to JIS K6301-$_{1975}$; an elongation of at least 300%; a strength of at least 30 kg /cm$^2$; and a compression set (70° C., 22 hours) of at most 30%.

On the other hand, the support member must surely and correctly press the above-mentioned plate member against the image-forming body. A variety of support members can be used provided that they have sufficiently high rigidity and favorable dimensional-accuracy, and also can be properly selected for use from those that have heretofore been used customarily in the cleaning blade for the image-forming body in an electrophotographic apparatus. There is usually used the support plate punched out of a steel plate by means of a pressing machine.

In the following, some description will be given of the process for producing the cleaning blade according to the present invention.

FIG. 2 is an explanatory drawing showing an example of a process f or producing the cleaning blade according to the present invention.

In the first place, unevenness is formed on at least part of the surface of a mold for molding the cleaning blade which surface is brought into contact with the molding material for the plate member. In this case, care should be taken not to form unevenness on the mold surface corresponding to the portion of the plate member in direct contact with the image-forming body.

The height of the unevenness (distance between the most protrudent place and the most depressed place) is not specifically limited, but is properly selected according to the circumstances. It is usually in the range of 50 to 500 $\mu$m The aforesaid height of less than 50 $\mu$m is unfavorable, since air fails to enter the clearance between the mold surface and the molding material for the plate member, thereby making mold releasing difficult, whereas said height of more than 500 $\mu$m is also unfavorable because of an increase in the variance of the thickness of the plate member, which gives rise to the deflection thereof.

There are available various methods for forming unevenness, which are exemplified in particular by a method in which glass beads having a roughness of No.100 to No.200 are blasted onto the surface of the mold. As to the place on which the unevenness is formed, it should be formed, as shown on FIG. 2(a), on the portion marked with 4 of the mold on the fixed side A, so that the cleaning plate is attached to the mold on the mobile side, at the time when the molds are opened after the completion of molding. The aforesaid procedure prevents the cleaning plate from being pulled or deflected.

Moreover, the unevenness may be formed, as shown on FIG. 2(a'), on both the portion marked with 4 of the mold on the fixed side A and the portion marked with 5 of the mold on the mobile side. In this case, however, some devices are needed so as to attach the cleaning plate to either of the molds when opened by making difference in the scope of forming the unevenness between the fixed side and the mobile side, or by altering the roughness of the unevenness depending upon the mold on the fixed or mobile side.

In the mold which has been equipped, in advance, with unevenness on at least part of the surface in contact with the molding material for the plate member, is placed, as shown in FIG. 2(a) or (a'), the support member which has been subjected to an adhesion treatment(for example, coated with Chemrock 218, followed by drying treatment at 80° C. for 2 hours). Subsequently, as shown in FIG. 2(b), a molten thermoplastic elastomer(the molding material for the plate member) 6 is cast into the molds through an injection part 7 to integrate both the members simultaneously with cooling of both the members inside of the molds.

At the point of time when sufficient temperature drop is achieved in the molds, thus bringing about the condition of enabling the plate member (blade portion) to be kept in its form and shape, the objective cleaning blade is obtained by taking out from the molds.

Since the cleaning blade thus obtained according to the present invention is attached to either the mold on the fixed side or the mold on the mobile side when it is taken out through the opening of the molds, it never occurs that the cleaning blade is pulled to either side or deflected; and besides an image-forming body is free from contamination because of nonusage of a mold release agent.

According to the present invention, it is made possible to obtain a cleaning blade which is used for cleaning an image-forming body in an electrophotographic apparatus, and which has excellent performances in that said cleaning blade is minimized in the deflection of its tip part, never contaminates an image-forming body and so forth.

Furthermore, the cleaning blade according to the present invention exhibits favorable working effects in that it can easily be taken out from the molds; the workability is enhanced; coating of a mold release agent is dispensed with at the time of molding; and thus the work in whole is simplified.

In the following, the present invention will be described in more detail with reference to a comparative example and a working example, which however shall not limit the present invention thereto.

EXAMPLE

Figure 3:
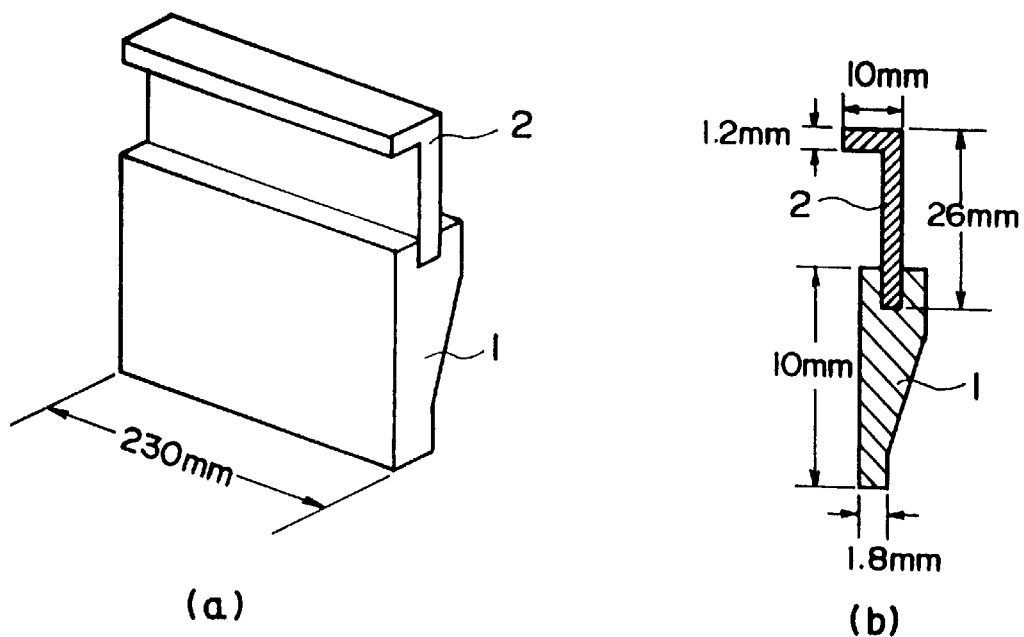
FIG. 3 is a perspective view (a) and a cross-sectional view (b) each showing the cleaning blade which has been produced in the working example of the present invention wherein the symbols 1 through 7 and A,B, and C are designated as follows.

A cleaning blade having a size as given on FIG. 3 was prepared in the following manner on the basis of the assumption of the cleaning blade being in a size of JIS A4. The inside surface of a mold on the fixed side was provided with unevenness of 200 $\mu$g m in average height as shown on FIG. 2 (a), by blasting glass beads having a roughness of No.100 onto the inside surface of the mold on the fixed side for the cleaning blade, except the mold surface corresponding to the plate member for the cleaning blade in direct contact with an image-forming body.

Subsequently there was arranged in the above-mentioned mold as shown on FIG. 2 (a), a support member 2 having the shape as shown on FIG. 3 which had been prepared by punching a galvanized steel sheet with the use of a pressing machine. Thereafter a molten urethane-based thermoplastic elastomer was cast into the molds as shown on FIG. 2 (b) to integrate the plate member and the support member, followed by cooling the mold.

After sufficient cooling, the molds were opened. As a result, mold opening was carried out in a state that the objective cleaning blade was attached to the inside of the mold on the mobile side. Consequently, the cleaning blade as shown on FIG. 3 could be taken out with ease without forming any deflection.

Comparative Example

The procedure in the Example was repeated to prepare a cleaning blade except that no unevenness was formed on the inside surface of the mold. After sufficient cooling, the molds were opened. As a result, mold opening was carried out in a state that the objective cleaning blade was attached to the inside of the molds on both the mobile side and the fixed side. Consequently, the cleaning blade was taken out with considerable difficulty as compared with the foregoing Example, accompanied by the deflection of the objective cleaning blade to some extent.

What is claimed is:

1. A process for producing a cleaning blade for scraping off remaining toner on a peripheral surface of an image forming body, wherein said image forming body will be free of contamination because of nonusage of a mold release agent in producing said cleaning blade, said cleaning blade including a plate member made of a thermoplastic elastomer and a support member, said process comprising the steps of:

providing a mold having an inner surface, said inner surface defining a surface of said plate member;

making at least part of said inner surface uneven with a roughness of 50 to 500 $\mu$m, wherein said at least part of said inner surface excludes a portion of the inner surface which defines a portion of the plate member surface which is brought into direct contact with said peripheral surface of said image forming body;

disposing said support member in said mold so that part of said support member partially occupies said mold;

introducing a molten thermoplastic elastomer into said mold while keeping air confined between said at least part of said inner surface which is uneven and said molten thermoplastic elastomer;

cooling and solidifying said molten thermoplastic elastomer to thereby form said cleaning blade with said support member integrally bonded to said plate member, said plate member having an unevenness on at least part of a surface thereof excluding said portion brought into direct contact with said peripheral surface of said image forming body, and taking said cleaning blade out of said mold with minimized deflection of the cleaning blade.

2. The process according to claim 1, wherein said step of making uneven includes blasting glass beads onto said at least part of said inner surface.

3. The process according to claim 1, wherein said excluded portion of said inner surface defines a 0.1 mm-wide portion along a tip edge of said plate member which is brought into direct contact with said peripheral surface of said image forming body.

* * * * *